US010066833B2

(12) United States Patent
Colannino et al.

(10) Patent No.: US 10,066,833 B2
(45) Date of Patent: Sep. 4, 2018

(54) BURNER SYSTEM EMPLOYING MULTIPLE PERFORATED FLAME HOLDERS, AND METHOD OF OPERATION

(71) Applicant: ClearSign Combustion Corporation, Seattle, WA (US)

(72) Inventors: Joseph Colannino, Bellevue, WA (US); Doug W. Karkow, Des Moines, WA (US); Christopher A. Wiklof, Everett, WA (US)

(73) Assignee: CLEARSIGN COMBUSTION CORPORATION, Seattle, WA (US)

(*) Notice: Subject to any disclaimer, the term of this patent is extended or adjusted under 35 U.S.C. 154(b) by 323 days.

(21) Appl. No.: 15/023,039

(22) PCT Filed: Sep. 23, 2014

(86) PCT No.: PCT/US2014/057074
§ 371 (c)(1),
(2) Date: Mar. 18, 2016

(87) PCT Pub. No.: WO2015/042614
PCT Pub. Date: Mar. 26, 2015

(65) Prior Publication Data
US 2016/0230984 A1 Aug. 11, 2016

Related U.S. Application Data

(60) Provisional application No. 62/037,104, filed on Aug. 13, 2014, provisional application No. 61/881,368, filed on Sep. 23, 2013.

(51) Int. Cl.
*F23C 5/08* (2006.01)
*F23D 23/00* (2006.01)
(Continued)

(52) U.S. Cl.
CPC ............. *F23D 11/406* (2013.01); *F01K 5/02* (2013.01); *F22B 7/08* (2013.01); *F23C 5/08* (2013.01);
(Continued)

(58) Field of Classification Search
CPC ........ F23D 11/406; F23D 11/02; F23D 23/00; F23D 2203/105; F23D 2208/10;
(Continued)

(56) References Cited

U.S. PATENT DOCUMENTS 1,537,335 A * 5/1925 Cross .................. F23D 14/48
431/326
2,095,065 A 10/1937 Hays
(Continued)

FOREIGN PATENT DOCUMENTS

CN 101046304 10/2007
JP 60080015 A * 5/1985 ............. F23D 14/16
(Continued)

OTHER PUBLICATIONS

PCT International Search Report and Written Opinion of International PCT Application No. PCT/US2014/057074 dated Jan. 14, 2015.
(Continued)

*Primary Examiner* — Gregory Huson
*Assistant Examiner* — Daniel E Namay
(74) *Attorney, Agent, or Firm* — Christopher A. Wiklof; Nicholas S. Bromer; Launchpad IP, Inc.

(57) ABSTRACT

A burner system includes a plurality of burners, each having a nozzle positioned to emit a stream of fuel into a combustion volume, and a perforated flame holder, including a plurality of apertures extending between first and second faces thereof, and positioned to receive a stream of fuel from the respective nozzle. In operation, the flame holders are
(Continued)

configured to hold a flame substantially within the plurality of apertures.

32 Claims, 9 Drawing Sheets

(51) Int. Cl.
| | |
|---|---|
| F22B 7/08 | (2006.01) |
| F23D 14/16 | (2006.01) |
| F23D 11/40 | (2006.01) |
| F23N 5/02 | (2006.01) |
| F01K 5/02 | (2006.01) |
| F23D 11/02 | (2006.01) |
| F22B 1/18 | (2006.01) |
| F23D 99/00 | (2010.01) |

(52) U.S. Cl.
CPC .............. *F23D 11/02* (2013.01); *F23D 14/16* (2013.01); *F23D 23/00* (2013.01); *F23N 5/022* (2013.01); *F22B 1/1807* (2013.01); *F23C 2203/20* (2013.01); *F23D 91/04* (2015.07); *F23D 2203/105* (2013.01); *F23D 2208/10* (2013.01); *F23N 2025/19* (2013.01); *F23N 2037/02* (2013.01); *F23N 2041/10* (2013.01)

(58) Field of Classification Search
CPC ...... F23D 2041/10; F23D 14/16; F23D 91/04; F23C 5/08; F23C 2203/20; F23N 5/022; F23N 2025/19; F23N 2025/04; F23N 2037/02; F22B 7/08; F22B 1/1807
USPC .......... 431/7, 12, 19, 41, 174, 181, 328, 326
See application file for complete search history.

(56) References Cited

U.S. PATENT DOCUMENTS

| | | | | |
|---|---|---|---|---|
| 2,775,294 A | * | 12/1956 | Schwank | F23D 14/14 126/39 J |
| 3,188,366 A | * | 6/1965 | Flynn | F23D 14/16 156/308.4 |
| 3,321,001 A | * | 5/1967 | Vezzoli | F23C 99/00 431/22 |
| 3,324,924 A | | 6/1967 | Hailstone et al. | |
| 3,810,732 A | * | 5/1974 | Koch | F23C 99/006 126/92 AC |
| 3,947,233 A | * | 3/1976 | Sundberg | F23D 14/02 431/328 |
| 4,021,188 A | | 5/1977 | Yamagishi et al. | |
| 4,081,958 A | | 4/1978 | Schelp | |
| 4,397,356 A | * | 8/1983 | Retallick | E21B 36/02 122/31.1 |
| 4,408,461 A | | 10/1983 | Bruhwiler et al. | |
| 4,483,673 A | | 11/1984 | Murai et al. | |
| 4,643,667 A | | 2/1987 | Fleming | |
| 4,673,349 A | | 6/1987 | Abe et al. | |
| 4,752,213 A | * | 6/1988 | Grochowski | F23D 14/02 431/328 |
| 5,174,744 A | * | 12/1992 | Singh | F23D 14/26 126/91 R |
| 5,211,552 A | * | 5/1993 | Krill | F23D 14/16 431/328 |
| 5,249,953 A | * | 10/1993 | Roth | F23D 14/16 126/92 AC |
| 5,326,257 A | | 7/1994 | Taylor et al. | |
| 5,380,192 A | * | 1/1995 | Hamos | F23D 14/02 431/328 |
| 5,431,557 A | * | 7/1995 | Hamos | F23D 14/02 431/328 |
| 5,441,402 A | | 8/1995 | Reuther et al. | |
| 5,567,147 A | * | 10/1996 | Fenn | F23D 14/14 431/328 |
| 5,641,282 A | | 6/1997 | Lee et al. | |
| 5,746,194 A | * | 5/1998 | Legutko | F23D 14/18 126/91 A |
| 5,749,721 A | * | 5/1998 | Klinge | F23D 14/16 431/328 |
| 5,899,686 A | | 5/1999 | Carbone et al. | |
| 5,957,682 A | * | 9/1999 | Kamal | F23D 14/36 431/115 |
| 5,993,192 A | | 11/1999 | Schmidt et al. | |
| 6,095,798 A | * | 8/2000 | Mitani | F23C 3/002 431/11 |
| 6,431,857 B1 | * | 8/2002 | Charmes | F23D 14/18 431/326 |
| 6,997,701 B2 | | 2/2006 | Volkert et al. | |
| 7,241,137 B2 | * | 7/2007 | Leinemann | A62C 4/02 431/328 |
| 7,279,137 B2 | * | 10/2007 | Alford | B82Y 30/00 422/129 |
| 7,360,506 B2 | | 4/2008 | Shellenberger et al. | |
| 7,717,704 B2 | * | 5/2010 | Burtea | F23D 14/145 110/295 |
| 8,540,509 B1 | * | 9/2013 | Cantal | F23K 5/007 431/326 |
| 9,377,190 B2 | | 6/2016 | Karkow et al. | |
| 9,388,981 B2 | | 7/2016 | Karkow et al. | |
| 9,447,965 B2 | | 9/2016 | Karkow et al. | |
| 2002/0155403 A1 | | 10/2002 | Griffin et al. | |
| 2004/0072110 A1 | * | 4/2004 | Kayahara | F23C 9/08 431/5 |
| 2004/0081933 A1 | | 4/2004 | St. Charles et al. | |
| 2006/0141413 A1 | | 6/2006 | Masten et al. | |
| 2007/0048685 A1 | * | 3/2007 | Kuenzler | F23D 14/78 431/328 |
| 2008/0268387 A1 | | 10/2008 | Saito et al. | |
| 2009/0111065 A1 | * | 4/2009 | Tompkins | F23N 1/022 431/12 |
| 2010/0178219 A1 | | 7/2010 | Verykios et al. | |
| 2011/0076628 A1 | | 3/2011 | Miura et al. | |
| 2012/0164590 A1 | | 6/2012 | Mach | |
| 2012/0301837 A1 | * | 11/2012 | Akagi | F23D 14/08 431/328 |
| 2015/0118629 A1 | | 4/2015 | Colannino et al. | |
| 2015/0276217 A1 | | 10/2015 | Karkow et al. | |
| 2015/0285491 A1 | | 10/2015 | Karkow et al. | |
| 2015/0316261 A1 | | 11/2015 | Karkow et al. | |
| 2015/0330625 A1 | | 11/2015 | Karkow et al. | |
| 2015/0362177 A1 | | 12/2015 | Krichtafovitch et al. | |
| 2015/0362178 A1 | | 12/2015 | Karkow et al. | |
| 2015/0369477 A1 | | 12/2015 | Karkow et al. | |
| 2016/0003471 A1 | | 1/2016 | Karkow et al. | |
| 2016/0018103 A1 | | 1/2016 | Karkow et al. | |
| 2016/0025333 A1 | | 1/2016 | Karkow et al. | |
| 2016/0025374 A1 | | 1/2016 | Karkow et al. | |
| 2016/0025380 A1 | | 1/2016 | Karkow et al. | |
| 2016/0046524 A1 | | 2/2016 | Colannino et al. | |
| 2016/0091200 A1 | | 3/2016 | Colannino et al. | |
| 2016/0238240 A1 | | 8/2016 | Colannino et al. | |
| 2016/0238242 A1 | | 8/2016 | Karkow et al. | |
| 2016/0238277 A1 | | 8/2016 | Colannino et al. | |
| 2016/0238318 A1 | | 8/2016 | Colannino et al. | |
| 2016/0245509 A1 | | 8/2016 | Karkow et al. | |

FOREIGN PATENT DOCUMENTS

| | | | | |
|---|---|---|---|---|
| JP | 02118307 A | * | 5/1990 | |
| JP | 04320716 A | * | 11/1992 | |
| JP | 07-243622 | | 9/1995 | |
| JP | 09280516 A | * | 10/1997 | ............. F23C 3/002 |
| WO | WO 1995/000803 | | 1/1995 | |
| WO | WO 2015/042615 | | 3/2015 | |
| WO | WO 2015/054323 | | 4/2015 | |
| WO | WO 2015/061760 | | 4/2015 | |
| WO | WO 2015/070188 | | 5/2015 | |
| WO | WO 2015/112950 | | 7/2015 | |
| WO | WO 2015/123149 | | 8/2015 | |
| WO | WO 2015/123381 | | 8/2015 | |

(56) References Cited

FOREIGN PATENT DOCUMENTS

| WO | WO 2015/123670 | 8/2015 |
|---|---|---|
| WO | WO 2015/123683 | 8/2015 |
| WO | WO 2015/123694 | 8/2015 |
| WO | WO 2015/123696 | 8/2015 |
| WO | WO 2015/123701 | 8/2015 |
| WO | WO 2016/007564 | 1/2016 |
| WO | WO 2016/105489 | 6/2016 |
| WO | WO 2016/133934 | 8/2016 |
| WO | WO 2016/133936 | 8/2016 |
| WO | WO 2016/134061 | 8/2016 |
| WO | WO 2016/134068 | 8/2016 |
| WO | WO 2016/141362 | 9/2016 |

OTHER PUBLICATIONS

Arnold Schwarzenegger, "A Low NOx Porous Ceramics Burner Performance Study," California Energy Commission Public Interest Energy Research Program, Dec. 2007, San Diego State University Foundation, p. 5.

Howell, J.R., et al.; "Combustion of Hydrocarbon Fuels Wdhin Porous Inert Media," Dept. of Mechanical Engineering, The University of Texas at Austin. Prog. Energy Combust. Sci., 1996, vol. 22, p. 121-145.

* cited by examiner

FIG. 9

BURNER SYSTEM EMPLOYING MULTIPLE PERFORATED FLAME HOLDERS, AND METHOD OF OPERATION

CROSS REFERENCE TO RELATED APPLICATIONS

The present application is a U.S. National Phase application under 35 U.S.C. § 371 of International Patent Application No. PCT/US2014/057074, entitled "BURNER SYSTEM EMPLOYING MULTIPLE PERFORATED FLAME HOLDERS, AND METHOD OF OPERATION," filed Sep. 23, 2014; which application claims priority benefit from U.S. Provisional Patent Application No. 62/037,104, entitled "DUPLEX INSTANTIATIONS," filed Aug. 13, 2014, and claims priority benefit from U.S. Provisional Patent Application No. 61/881,368, entitled "PROGRESS AND RECENT ADVANCES USING ELECTRODYNAMIC COMBUSTION CONTROL," filed Sep. 23, 2013, at the date of filing; each of which, to the extent not inconsistent with the disclosure herein, is incorporated by reference.

BACKGROUND

Industrial burner systems are employed in a wide range of industries, to perform many different tasks. These include, for example, production of steam to drive turbines for electrical generation, for providing motive power in large transports such as steamships, and for driving industrial processes. Burner systems are also employed in foundries, smelting systems, furnaces, refineries, chemical plants for heating working fluids, powering endothermic reactions, etc.

SUMMARY

According to an embodiment, a burner system is provided, including a plurality of nozzles positioned and configured to emit respective streams of fuel into a combustion chamber, and a plurality of flame holders, each including a plurality of apertures extending between first and second faces thereof, and each positioned, in the combustion chamber, to receive a stream of fuel from a respective one of the plurality of nozzles. Each of the plurality of flame holders is configured to hold a flame substantially between its first and second faces during a heating operation of the respective one of the flame holders.

According to an embodiment, the combustion chamber has a cylindrical shape, with a plurality of heat exchange tubes positioned in a circular configuration, substantially concentric with the cylindrically shaped combustion chamber and surrounding the plurality of flame holders. According to an alternate embodiment, the heat exchange tubes are arranged between and around individual flame holders.

According to an embodiment, a master fuel valve is coupled to each of the plurality of nozzles and configured to separately regulate a flow of fuel to each of the nozzles. The master valve can be a single component with separate couplings and control elements for each nozzle, or it can include a plurality of separate valve components, each coupled to a respective one of the nozzles.

According to an embodiment, a controller is provided, configured to control operation of the master fuel valve. The controller is configured to control the flow of fuel to each of the nozzles in response to a detected parameter of the boiler system. The detected parameter can be, for example, one or more of: a pressure within the burner system, a fluid temperature, a fluid volume transiting the system, and an anticipated heat demand.

According to an embodiment, the burner system includes a fluid input chamber in fluid communication with a first end of each of the plurality of heat exchange tubes and configured to provide a flow of working fluid to each of the plurality of heat exchange tubes. The burner system also includes a fluid output chamber in fluid communication with a second end of each of the plurality of heat exchange tubes and configured to receive a flow of working fluid from each of the plurality of heat exchange tubes.

According to an embodiment, the burner system further includes a plurality of fluid return tubes extending between the fluid input chamber and the fluid output chamber and configured to transmit working fluid from the fluid output chamber to the fluid input chamber According to an embodiment, a method of operating a burner system provided, including emitting a stream of fuel from ones of a plurality of fuel nozzles toward respective ones of a plurality of flame holders positioned within a combustion chamber. The method further includes holding a flame substantially between first and second faces of each of the respective ones of the plurality of flame holders and transmitting heat generated by the flames to a heat-receiving structure. Holding a flame between the first and second faces of the respective ones of the plurality of flame holders includes holding the flame substantially within a plurality of apertures extending between the first and second faces of each of the flame holders.

According to an embodiment, the method includes selectively controlling a flow of fuel to each of the plurality of fuel nozzles, and can include selecting a number of the plurality of fuel nozzles from which to emit a flow of fuel according to a quantity of heat to be generated in the burner system.

According to an embodiment, the method includes selecting a number of the plurality of fuel nozzles from which to emit a flow of fuel according to a detected parameter of the burner system. The detected parameter can be one or more of: a pressure within the system, a fluid temperature within the system, and a volume of fluid transiting the system. Additionally, the number of fuel nozzles from which to emit a flow of fuel can be selected according to a rate of change of the detected parameter, and/or according to a magnitude and polarity of a difference between the detected parameter and a target value of the parameter.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
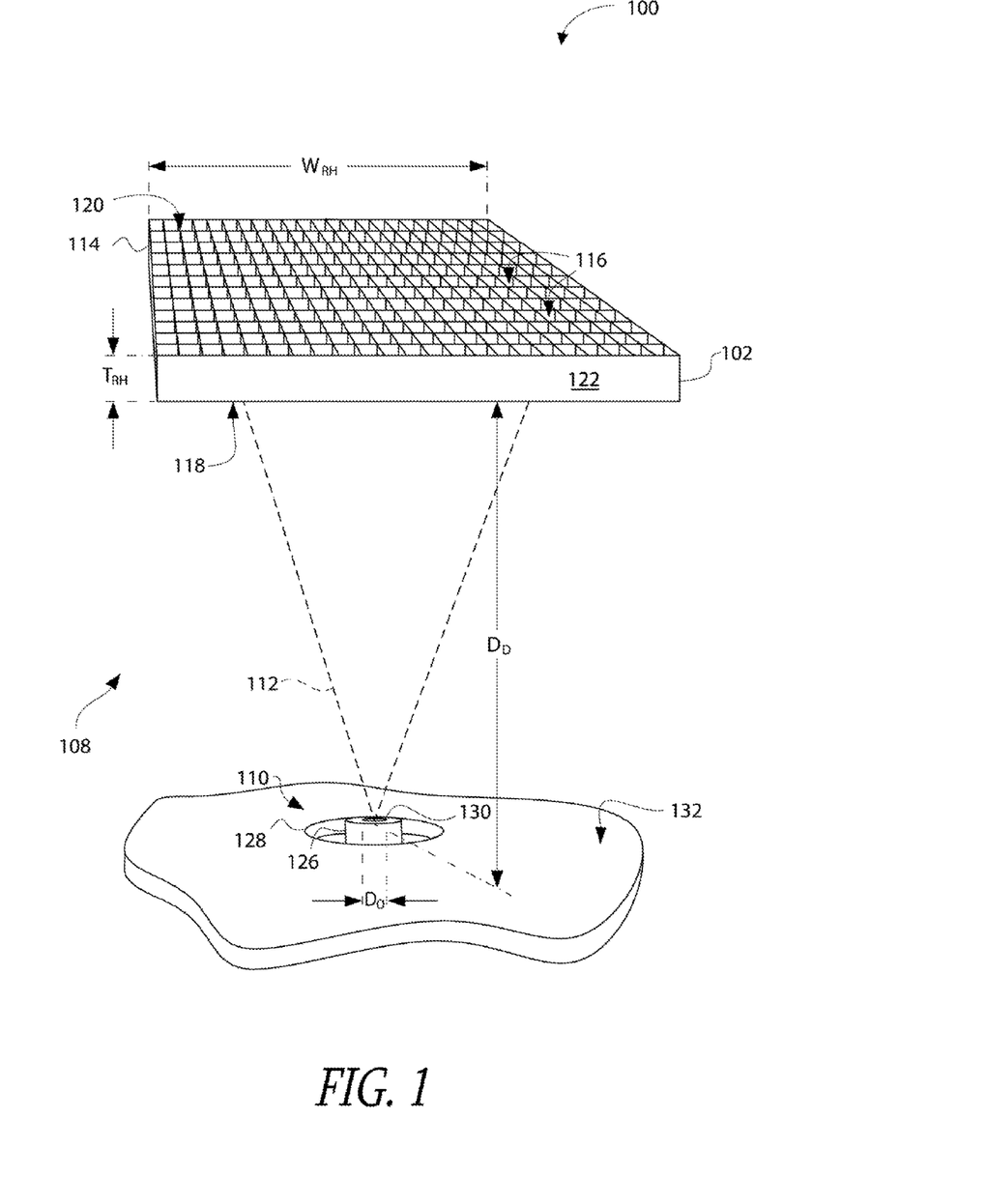
FIG. 1 is a simplified perspective view of details of a burner system including a perforated flame holder, according to an embodiment.
Figure 2:
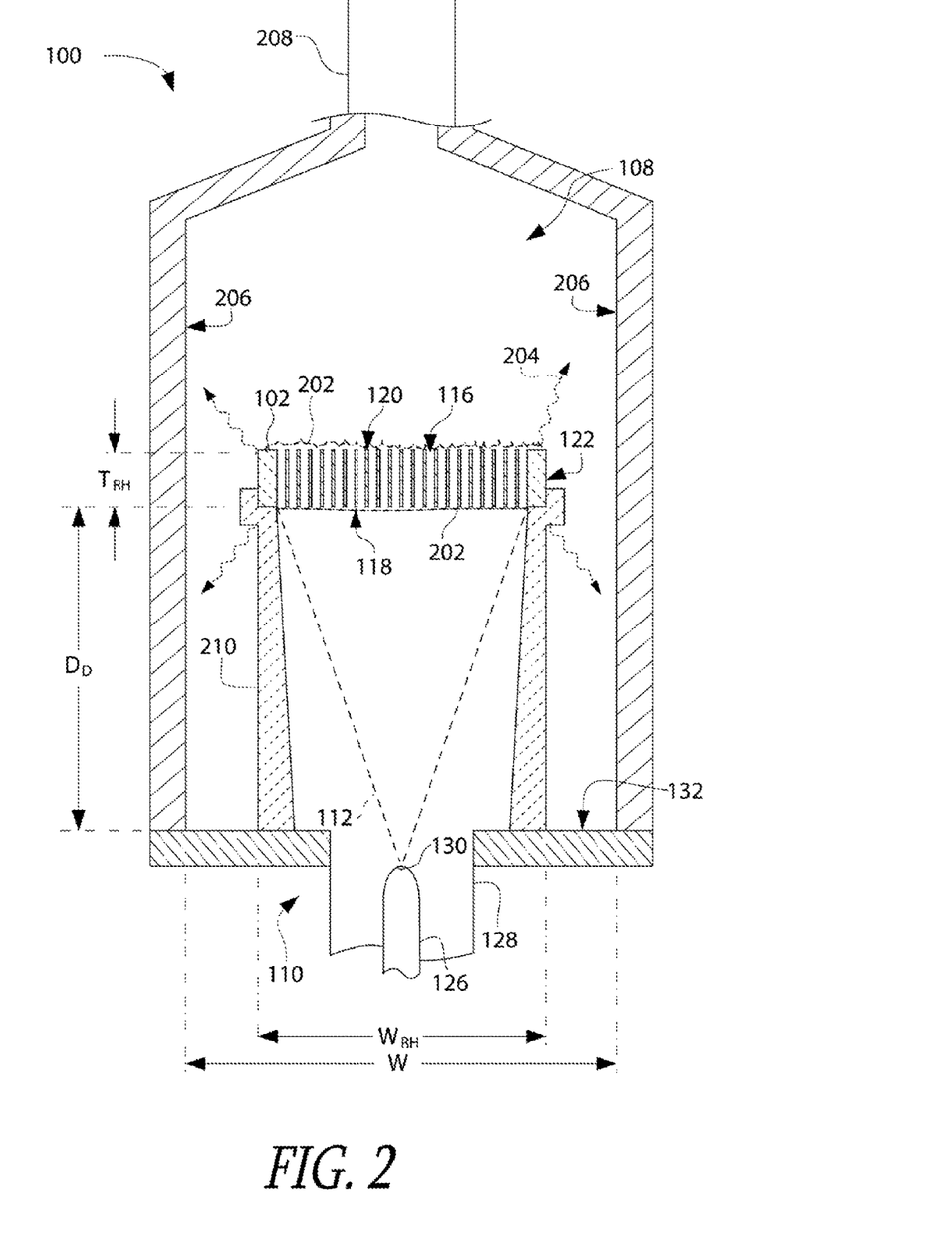
FIG. 2 is a simplified side sectional view of the burner system of FIG. 1, according to an embodiment.

FIG. 1 is a simplified perspective view of details of a burner system 100 including a perforated flame holder 102, according to an embodiment. FIG. 2 is a simplified side sectional view of the burner system 100 of FIG. 1, according to an embodiment. Referring to FIGS. 1 and 2, the burner system 100 includes a fuel and oxidant source 110 disposed to output fuel and oxidant into a combustion volume 108 to form a fuel and oxidant mixture 112. The perforated flame holder 102 is disposed in the combustion volume 108. The perforated flame holder 102 includes a perforated flame holder body 114 defining a plurality of apertures 116 aligned to receive the fuel and oxidant mixture 112 from the fuel and oxidant source 110. The apertures 116 are configured to collectively hold a combustion reaction 202 supported by the fuel and oxidant mixture 112.

The perforated flame holder 102 can also be referred to as a perforated flame holder or simply as a flame holder.

The combustion volume 108 is defined by a base surface 132 and inner surfaces 206 of sidewalls substantially enclosing the combustion volume 108 laterally and above.

The fuel can include a hydrocarbon gas or a vaporized hydrocarbon liquid, for example. The fuel can be a single species or can include a mixture of gases and vapors. For example in a process heater application, the fuel can include fuel gas or byproducts from the process that includes carbon monoxide (CO), hydrogen ($H_2$), and methane ($CH_4$). In another application the fuel can include natural gas (mostly $CH_4$) or propane. In another application, the fuel can include #2 fuel oil or #6 fuel oil. Dual fuel applications and flexible fuel applications are similarly contemplated by the inventors. The oxidant can include oxygen carried by air and/or can include another oxidant, either pure or carried by a carrier gas.

Generally, the combustion reaction 202 held by the perforated reaction holder 102 is indicative of a gas phase oxidation reaction. Other reactants and reactions may be substituted without departing from the spirit and scope of the disclosure. The term flame, which is used herein interchangeably with the term combustion reaction, is to be understood as having the same scope as the term combustion reaction, unless indicated otherwise.

According to an embodiment, the perforated flame holder body 114 is bounded by an input face 118 disposed to receive the fuel and oxidant mixture 112, an output face 120 facing away from the fuel and oxidant source 110, and a peripheral surface 122 defining a lateral extent of the perforated flame holder 102. The plurality of apertures 116 defined by the perforated flame holder body 114 extend from the input face 118 to the output face 120.

According to an embodiment, the perforated flame holder 102 is configured to hold a majority of the combustion reaction 202 within the apertures 116. For example, according to an embodiment, more than half the molecules of fuel output into the combustion volume 108 by the fuel and oxidant source 110 are converted to combustion products between the input face 118 and the output face 120 of the perforated flame holder 102. According to an alternative embodiment, more than half of the heat produced by the combustion reaction 202 is produced between the input face 118 and the output face 120 of the perforated flame holder 102. According to an embodiment, under nominal operating conditions, the perforated flame holder 102 is configured to hold at least 80% of the combustion reaction 202 between the input face 118 and the output face 120 of the perforated flame holder 102.

The perforated flame holder 102 is configured to receive heat from the combustion reaction 202 and output a portion of the received heat as thermal radiation 204 to heat-receiving structures in or adjacent to the combustion volume 108. The perforated flame holder 102 outputs another portion of the received heat to the fuel and oxidant mixture 112 received at the input face 118 of the perforated flame holder 102.

In this way, the perforated flame holder 102 acts as a heat source to maintain the combustion reaction 202, even under conditions where a combustion reaction would not be stable when supported from a conventional flame holder. This capability can be leveraged to support combustion using a leaner fuel to oxidant mixture than was previously feasible. Leaner combustion results in lower peak combustion temperature and reduces oxides of nitrogen ($NO_x$) output. Moreover, the perforated flame holder body 114 may act as a heat sink to cool hotter parts of the combustion reaction 202 to further minimize combustion temperature. Finally, substantial containment of the combustion reaction 202 between the input face 118 and the output face 120 of the perforated flame holder 102 limits the time during which the combustion fluid (including molecular nitrogen, $N_2$, if the oxidant includes oxygen carried by air) is exposed to high temperature. The inventors believe this further limits $NO_x$ output.

Cooled flue gas is vented to the atmosphere through an exhaust flue 208. Optionally, the vented flue gas can pass through an economizer that pre-heats the combustion air, the fuel, and/or feed water.

According to an embodiment, the perforated flame holder 102 has a width dimension $W_{RH}$ between opposite sides of the peripheral surface 122 that is at least twice a thickness dimension $T_{RH}$ between the input face 118 and the output face 120. According to another embodiment, the perforated flame holder 102 has a width dimension $W_{RH}$ of at least three times the thickness dimension $T_{RH}$. According to a further embodiment, the perforated flame holder 102 has a width dimension $W_{RH}$ at least six times the thickness dimension $T_{RH}$. According to another embodiment, the perforated flame holder 102 has a width dimension $W_{RH}$ of at least nine times the thickness dimension $T_{RH}$.

According to an embodiment, the perforated flame holder 102 has a width dimension $W_{RH}$ that is less than a corresponding width dimension W of the combustion volume 108. This allows circulation of flue gas from above to below the perforated flame holder 102.

According to an embodiment, the perforated flame holder 102 is formed from a refractory material. According to another embodiment, the perforated flame holder 102 is formed from an aluminum silicate material. According to another embodiment, the perforated flame holder 102 is formed from mullite or cordierite. According to an embodiment, the fuel and oxidant source 110 further includes a fuel nozzle 126 configured to output fuel into the combustion volume 108 and an oxidant source 128 configured to output a fluid including the oxidant into the combustion volume 108. For example, the oxidant source 128 can be configured to output air carrying oxygen.

The fuel nozzle 126 is configured to emit a fuel stream 112 adapted to entrain the oxidant as the fuel stream 112 travels through a dilution distance $D_D$ between the fuel nozzle 126 and the perforated flame holder 102. Additionally or alternatively, the fuel nozzle 126 can be configured to emit a fuel stream 112 adapted to entrain the oxidant and to entrain flue gas as the fuel stream 112 travels through the dilution distance $D_D$. The dilution distance $D_D$ corresponds to a distance between the input face 118 of the perforated flame holder 102 and an output orifice 130 of the fuel nozzle 126.

According to an embodiment, the burner system 100 includes a flame holder support structure 210 configured to support the perforated flame holder 102 within the combustion volume 108 with the input face 118 lying substantially normal to a longitudinal axis of the nozzle 126.

The output orifice 130 of the fuel nozzle 126 has a dimension $D_O$. According to an embodiment, the perforated flame holder 102 is positioned to receive the fuel and oxidant mixture 112 a distance $D_D$ from the output orifice 130 that is greater than 20 times the dimension $D_O$ of the fuel orifice 130. According to another embodiment, the distance $D_D$ is at least 100 times the dimension $D_O$. According to a further embodiment, the distance $D_D$ is at least 245 times the dimension $D_O$.

Hereafter, a reference to fuel can be understood as being a reference to fuel or to a fuel/oxidant mix, as appropriate in the particular context.

Figure 3:
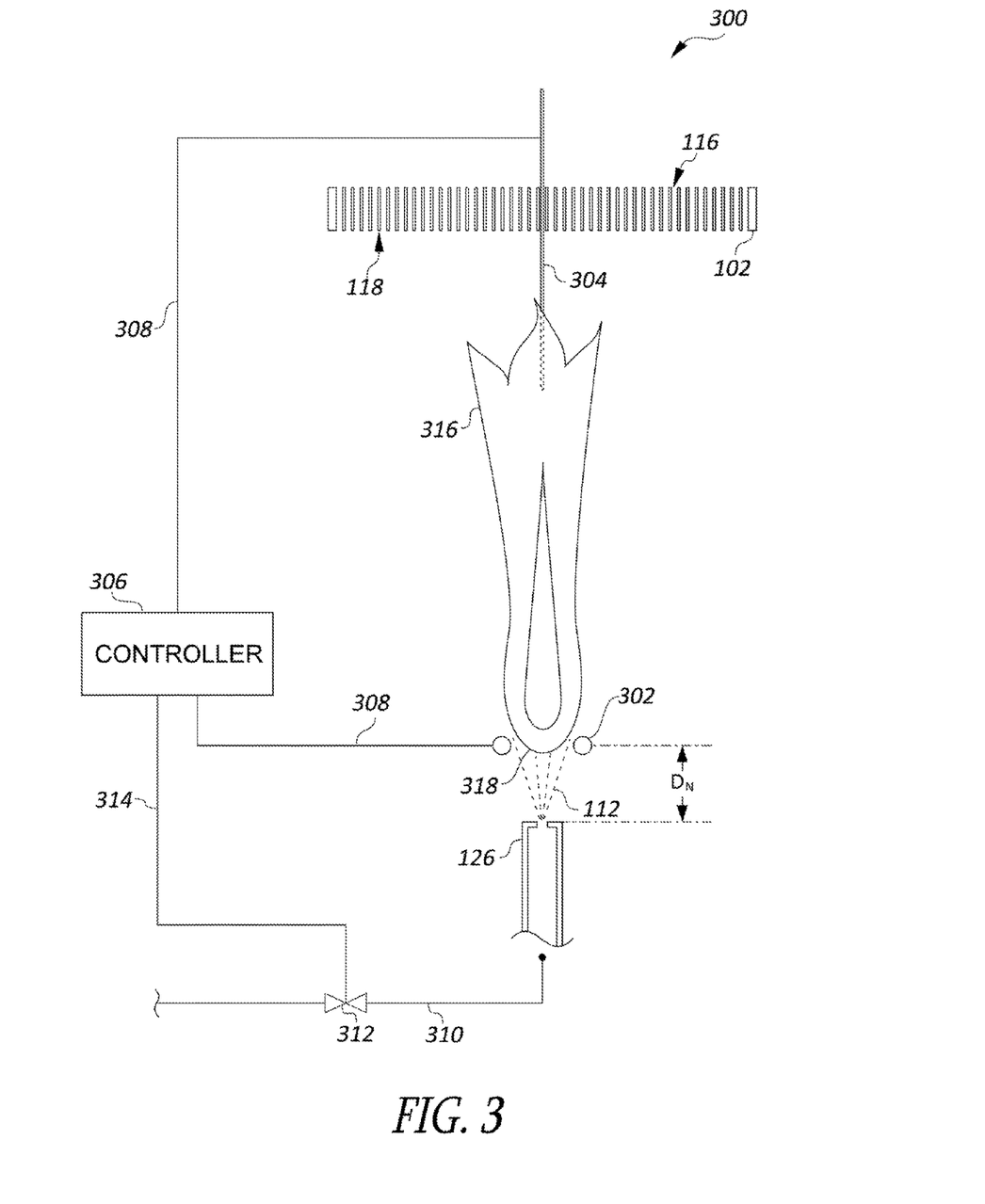
FIG. 3 is a diagrammatic view of a burner including a perforated flame holder, in a preheat mode of operation, according to an embodiment.
Figure 4:
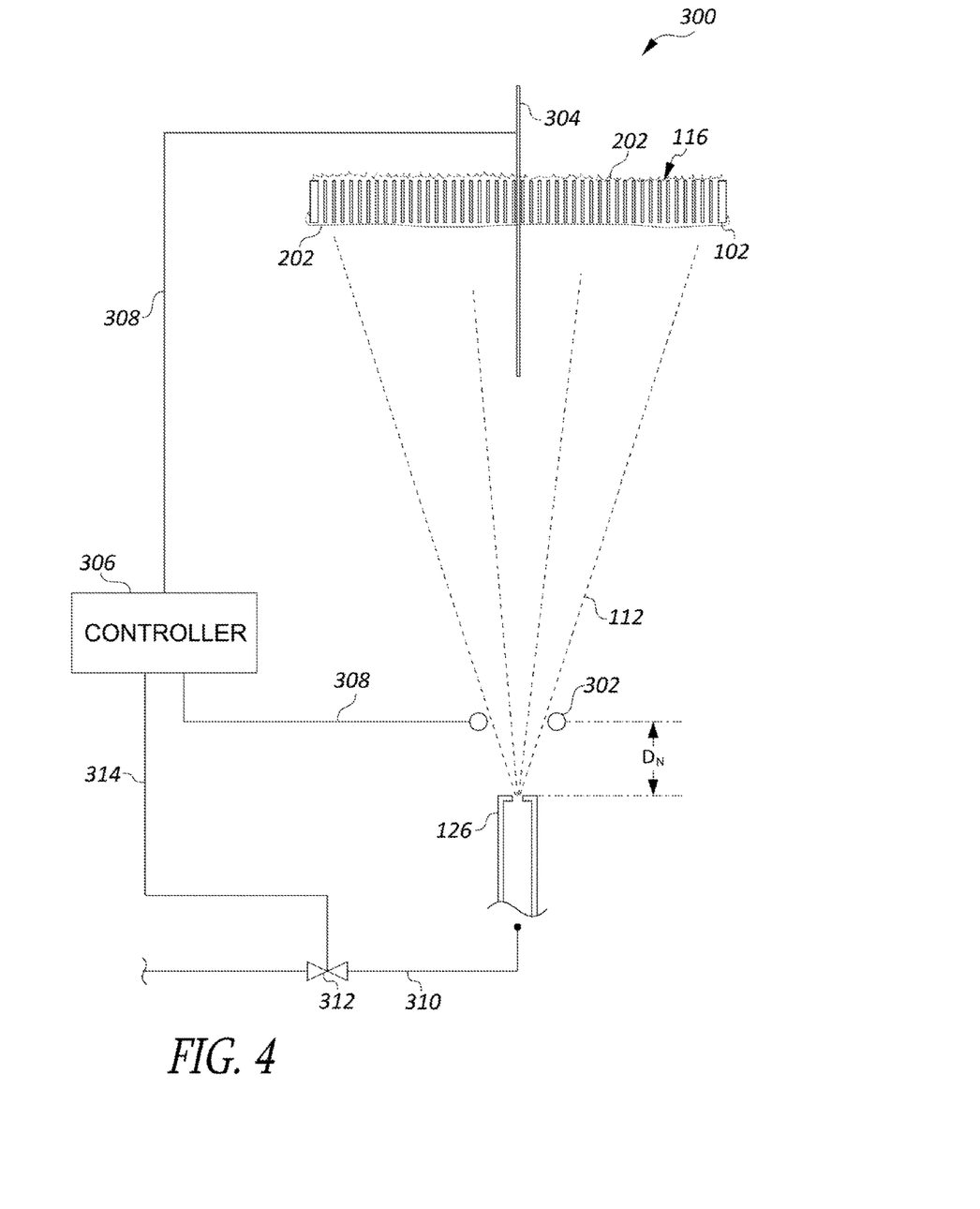
FIG. 4 is a diagrammatic view of the burner of FIG. 3 in a heating mode of operation.

FIGS. 3 and 4 are diagrammatic views of a burner 300 during respective modes of operation, according to an embodiment. The burner 300 includes a perforated flame holder 102 and a nozzle 126 as described above with reference to the burner system 100. Additionally, the burner 300 includes a controller 306, and first and second electrodes 302, 304. The first electrode 302 is configured as a flame holder electrode, while the second electrode 304 is configured as a charge electrode. The controller 306 is operatively coupled to the first electrode 302 and the second electrode 304 via connectors 308, and is configured to apply an electrical potential across the first and second electrodes 302, 304.

In the embodiment shown, the first electrode 302 has an annular shape, such as, for example, the shape of a toroid, and is positioned a distance $D_N$ from the nozzle 126, with a center axis aligned with a longitudinal axis of the nozzle 126. During operation, a fuel stream 112 emitted from the nozzle 126 will preferably have a conical shape, with a diameter that increases as a function of the distanced from the nozzle 126. Typically, the angle of dispersion of the fuel stream 112 is about 15 degrees, relative to the longitudinal axis of the nozzle 126. According to an embodiment, an inside diameter of the first electrode 302 is selected to be greater than a diameter of the fuel stream 112 at the distance $D_N$. According to another embodiment, the inside diameter of the first electrode 302 is selected to be equal to, or slightly less than the diameter of the fuel stream 112 at the distance $D_N$.

The nozzle 126 is configured to receive a flow of fuel via a fuel line 310. A valve 312 is coupled to the fuel line 310, and is configured to regulate a flow of fuel to the nozzle 126. The controller 306 is operatively coupled to the valve 312 via a connector 314, and is configured to provide a signal on the connector 314 by which operation of the valve 312 is controlled.

In FIG. 3, the burner 300 is shown in a preheat mode of operation. While operating in the preheat mode, the controller 306 controls the valve 312 to admit a flow of fuel to the nozzle 126 while simultaneously applying a voltage across the first and second electrodes 302, 304, and a preheat flame 316 is ignited in the fuel stream 112 by any of a number of well known methods. The second electrode 304 applies a charge of a first polarity to the preheat flame 316, while a voltage of an opposite polarity (or a ground potential) present at the first electrode 302 attracts charged species within the preheat flame 316. As a result, a flame front 318 of the preheat flame 316 is held in a region near the first electrode 302, which holds a substantial portion of the preheat flame 316 between the nozzle 126 and the perforated flame holder 102. With the preheat flame 316 in this position, the perforated flame holder 102 is heated by the flame 316.

According to an embodiment, the controller 306 is configured to apply an electrical potential that varies over time, such as, for example, an AC voltage, or an AC voltage with a DC offset. According to an embodiment, the electrical potential applied by the controller 306 has a peak-to-peak value that exceeds 10 kV. According to another embodiment, the electrical potential applied by the controller 306 has a peak-to-peak value that exceeds 20 kV. According to a further embodiment, the electrical potential applied by the controller 306 has a peak-to-peak value that exceeds 40 kV.

According to an embodiment, one or more amplifiers are provided, configured to receive a time-varying signal from the controller 306, to amplify the signal, and to provide the amplified signal to the first and second electrodes 302, 304.

In embodiments in which the inside diameter of the first electrode 302 is greater than the diameter of the fuel stream 112 at the distance $D_N$, there is no direct contact of the preheat flame 316 with the first electrode 302. Thus, there is no direct electrical path between the first and second electrodes 302, 304, and almost no electrical current. Accordingly, even though the voltage potential applied to the first and second electrodes 302, 304 can be very high, the power expended is minimal. For example, in an experimental combustion system operated by the inventors, with an applied peak-to-peak voltage of about 40 kV, power consumption was about 5 W.

When at least a portion of the perforated flame holder 102 has been heated to a minimum operating temperature by the preheat flame 316, the burner 300 transitions from the preheat mode to a heating mode (i.e., normal operation), as shown in FIG. 4. While transitioning to the heating mode of operation, the controller 306 terminates the application of the electrical potential across the first and second electrodes 302, 304, while continuing to control the valve 312 to admit fuel to the nozzle 126. Because of the velocity the fuel stream 112, in the absence of the charge applied to the flame 202 via the second electrode 304 and the counter charge present at the first electrode 302, the preheat flame 316 is not able to sustain itself within the fuel stream 112, and is extinguished. However, the minimum operating temperature of the perforated flame holder 102 is selected to be greater than the auto-combustion temperature of the fuel in the fuel stream 112. Thus, when the preheat flame 316 is extinguished by the high velocity of the fuel stream 112, a lifted flame 202 is immediately ignited within the apertures 116 of the perforated flame holder 102, and stable combustion commences at the flame holder 102.

The controller 306 regulates the heat output of the burner 300 by controlling the volume of fuel admitted by the valve 312. Combustion continues substantially as described with reference to FIGS. 1 and 2 for as long as the flow of fuel continues uninterrupted.

According to an embodiment, the charge electrode is retracted following transition to normal operation. This minimizes damage to the electrode caused by high temperatures, extending the life of the charge electrode 304.

While the structure and method described with reference to FIGS. 3 and 4 are effective in preheating the flame holder 102, other structures and methods can also be used for this purpose.

Figure 5:
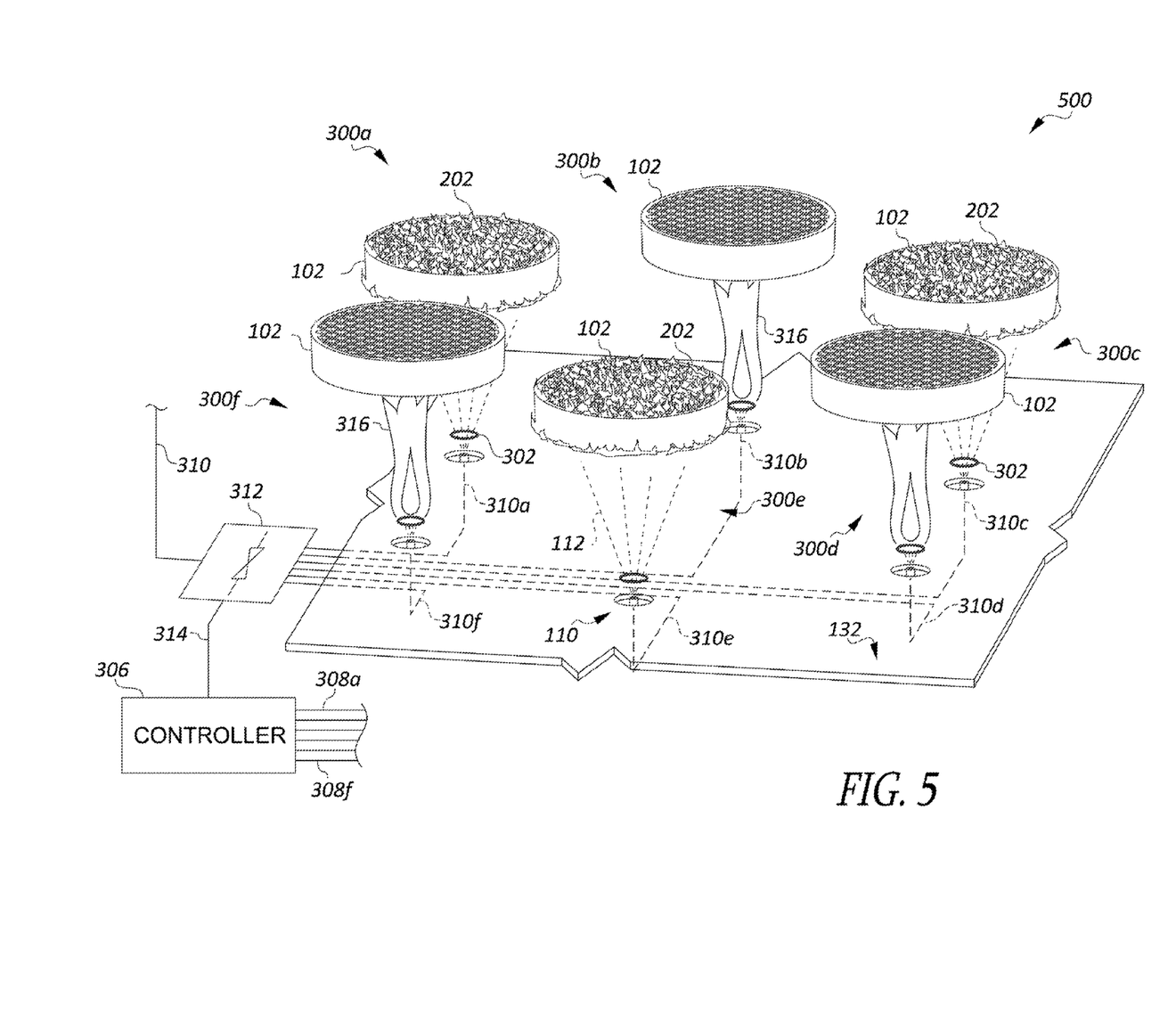
FIG. 5 is a perspective view of portions of a burner system that includes a plurality of burners, according to an embodiment.

FIG. 5 is a perspective view of portions of a combustion volume of burner system 500, according to an embodiment, that includes a plurality of burners 300a-f, similar to the burner 300 described above with reference to FIGS. 3 and 4. Each of the burners 300a-f includes a perforated flame holder 102, positioned, with reference to the flame holders 102a-f of the other burners 300, in a substantially coplanar configuration. The burner system 500 includes a master valve 312 and a controller 306. The master valve 312 is configured to control a flow of fuel to each of the burners 300a-f via a respective fuel line 310a-f. The controller 306 is operatively coupled to first and second electrodes 302, 304 via respective connectors 308a-f and configured to apply an electrical potential across the first and second electrodes of each of the burners 300, substantially as described with reference to FIG. 3. Additionally, the controller 306 is operatively coupled to the valve 312 via connector 314, and is configured to control operation of the valve 312 so as to control a flow of fuel to each of the burners 300a-f.

According to an embodiment, the master valve 312 is configured to be manually set to regulate a flow of fuel to each of the plurality of burners 300a-f.

According to another embodiment, the master valve 312 is configured for manual operation such, that a user can separately control or set a flow of fuel to each of the burners 300a-f. Thus, a user can select a number of burners to place in operation, or can shut down a single burner 300, independent of the operation of the other burners. For example, in the event of a fault or other problem with one of the burners 300a-f, the user can shut down that burner without affecting the operation of the remaining burners.

In FIG. 5, to reduce complexity and possible confusion, the connectors 308 are shown only where they couple to the controller 306, and the second electrodes 304 are not shown. These elements are described in more detail above, with reference to FIGS. 3 and 4.

According to an embodiment, the controller 306 is configured to provide a signal to the master valve 312 for each of the burners 300a-f, and thereby control a flow of fuel to each burner 300 independently of the other burners. Thus, during operation of the burner system 500, the controller 306 is configured to enable operation of any combination of the burners 300a-f according to a current or anticipated demand for heat output. For example, as depicted in FIG. 5, the burners 300a, 300c, and 300e are in normal operation, i.e., heating mode, in which the respective perforated flame holder 102 supports a lifted flame 202. Meanwhile, the burners 300b, 300d, and 300f are in preheat mode, in which a preheat flame 316 is temporarily held by the respective first electrode 302, generating a quantity of heat that raises the temperature of the respective perforated flame holder 102 to a minimum operating temperature. In a similar manner, any of the burners 300a-f can be shut down or brought into operation, as heat production requirements change. Thus, the range within which the heat production of the burner system 500 can be controlled extends from a minimum output, in which a single one of the burners 300 is operated at a minimum sustainable level, to a maximum output, in which all of the burners 300a-f are operated at their respective maximum output levels.

While the master valve 312 is shown as a single element configured to control a flow of fuel to each of the burners 300, multiple valves can be employed to perform an identical function, with each configured to receive a control signal from the controller 306. Thus, in embodiments that employ a plurality of fuel control valves, all of the valves, collectively, can be considered to comprise a single master valve.

According to another embodiment, the controller 306 is configured to provide a signal by which the master valve 312 controls flows of fuel to each of the burners 300a-f, such that each burner 300 is controlled by the same signal, and operates at substantially the same output level as the other burners 300a-f.

Figure 6:
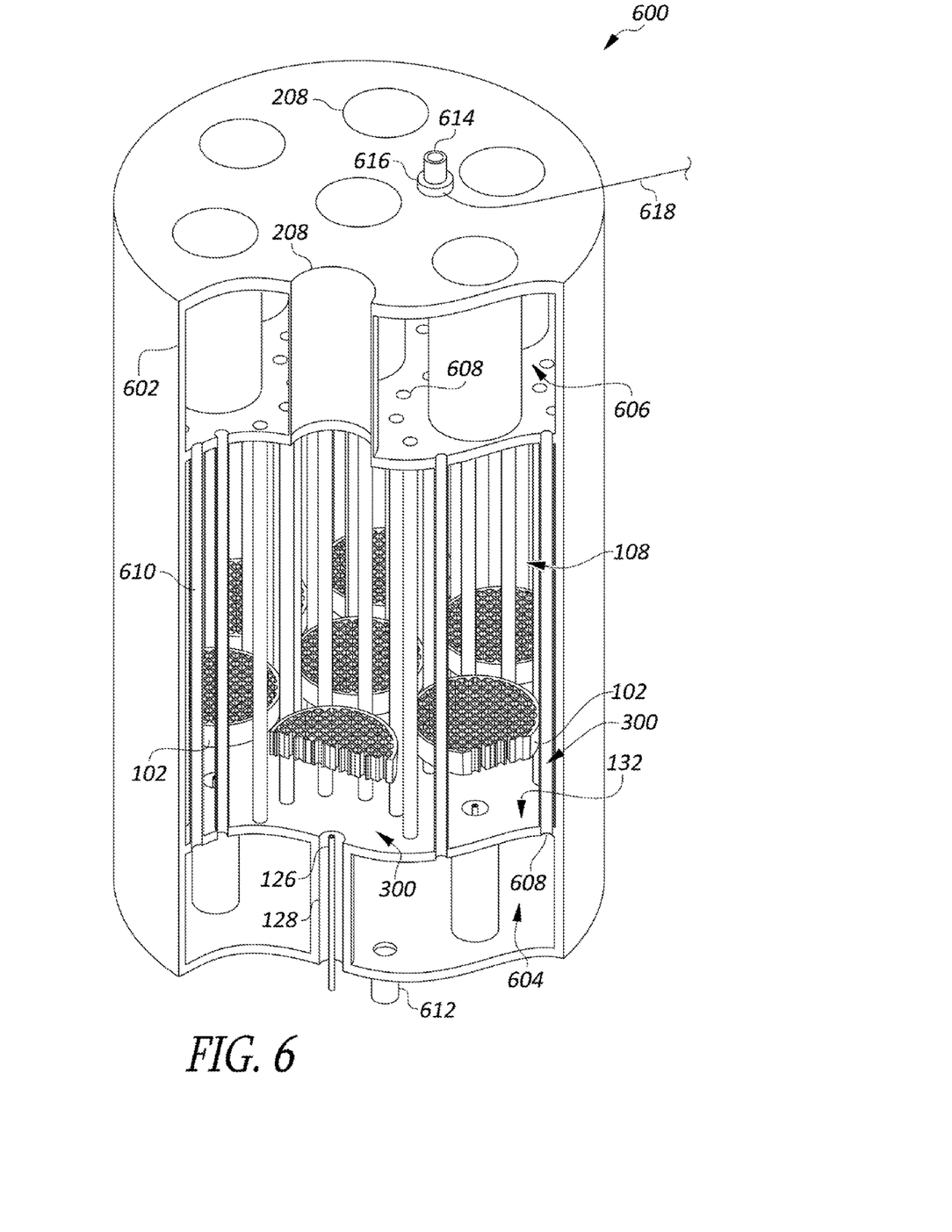
FIG. 6 is a simplified cutaway view of an industrial burner system employing a plurality of perforated flame holders, according to an embodiment.
Figure 7:
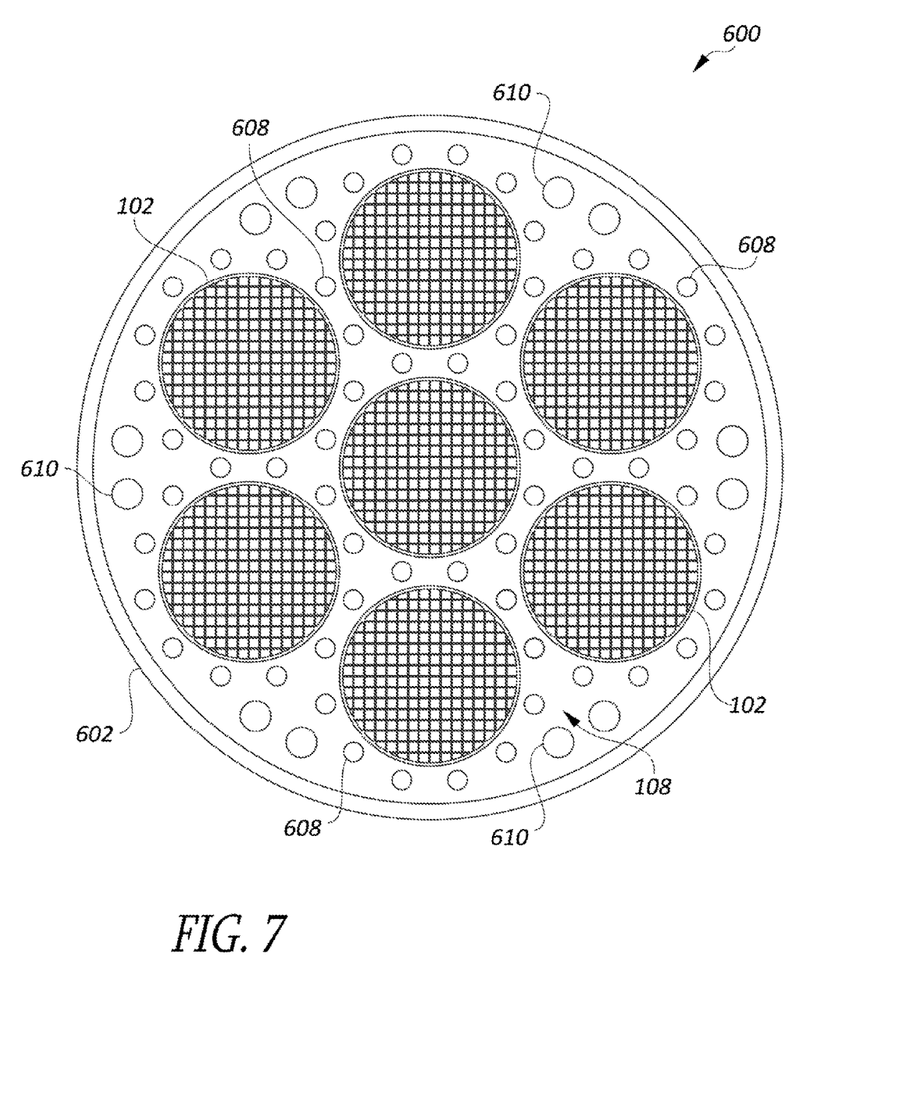
FIG. 7 is a top plan view of the combustion chamber portion of the system of FIG. 6, showing the arrangement of elements within the combustion volume, according to an embodiment.

FIG. 6 is a simplified cutaway view of an industrial burner system 600. In the embodiment shown, the burner system 600 is a water-tube boiler, but according to other embodiments, burner systems are provided with different configurations, including, for example, furnaces, heaters, and other process heating systems. FIG. 7 is a top plan view of the combustion chamber portion of the burner system 600, showing the arrangement of elements within the combustion volume 108. The burner system 600 includes walls 602 that define a water chamber 604, a combustion volume 108, and a steam chamber 606. A plurality of burners 300, including respective perforated flame holders 102, is positioned within the combustion volume 108. The burners 300 also include fuel nozzles 126 positioned to emit respective fuel streams toward the perforated flame holders 102.

Figure 8:
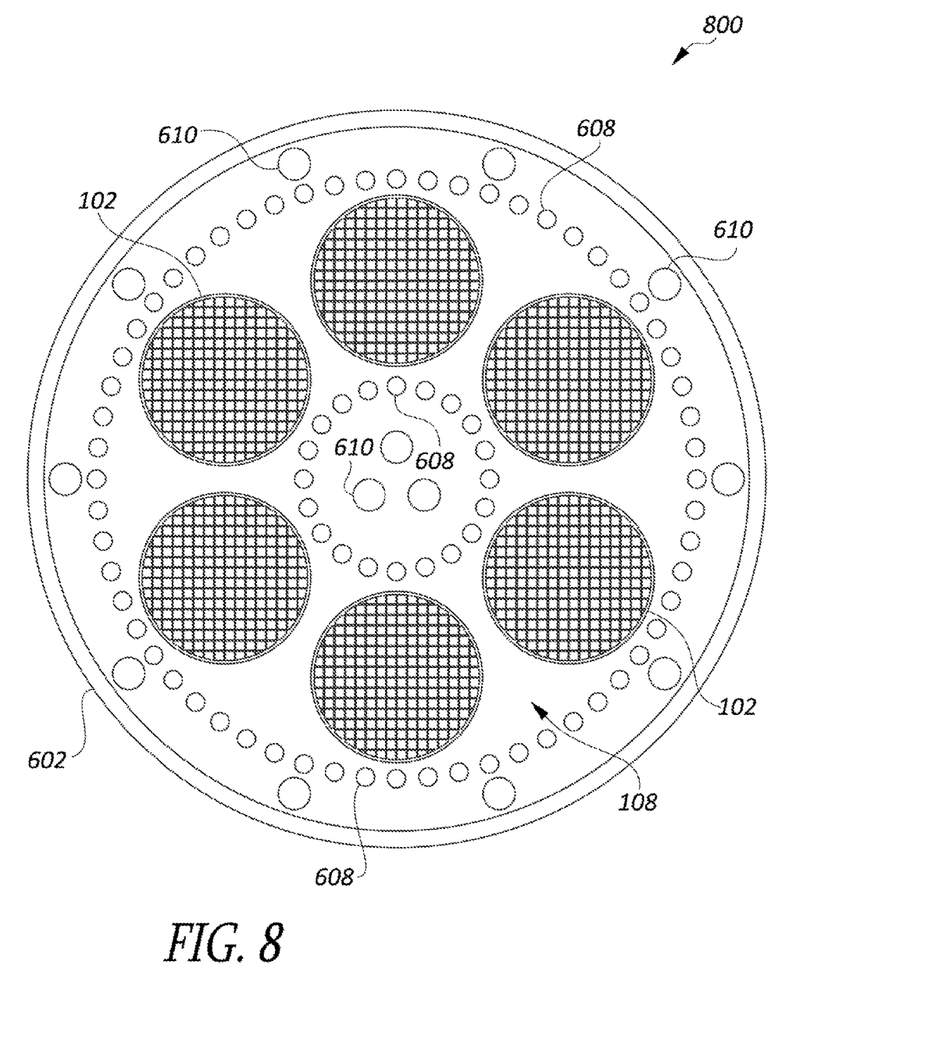
FIG. 8 is a top plan view of a portion of a burner system, according to an embodiment.

Respective pluralities of riser tubes 608 and down-comer tubes 610 extend from the water chamber 604 through the combustion volume 108 to the steam chamber 606, a longitudinal axis of each of the riser tubes and down-comer tubes lying substantially parallel to a common axis, with the perforated flame holders 102 lying normal to the common axis. The riser tubes 608 are arranged in close proximity to the perforated flame holders 102, while the down-comer tubes 610 are positioned farther from the perforated flame holders 102, and partially shielded from the flame holders 102 by the risers 608. The burner system 600 further includes a water inlet 612 coupled to the water chamber 604, a steam outlet 614 coupled to the steam chamber 606, and a pressure sensor 616 coupled to the steam chamber 606, and to a system controller via connector 618. Various elements that are not shown or described in detail with reference to FIGS. 6 and 7 are shown and/or described with reference to other embodiments, including, for example, a controller, fuel valves etc. FIG. 8 is a top plan view of a portion of a burner system 800, according to an embodiment, showing an alternative arrangement of flame holders 102, risers 608, and down-comers 610. In the burner system 800, a plurality of risers 608 are arranged in a circular pattern within the combustion volume 108, completely surrounding the multiple burners 300. Also shown are additional risers 608 also arranged in a circular pattern that is concentric to the plurality of risers 608 and inside the pattern of burners 300.

Down-comers 610 are in positions that are shielded from the burners 300 by the risers 608.

According to an embodiment, operation of the plurality of burners 300 of the burner systems 600 and 800 is similar to the operation described with reference to FIG. 5. For example, according to an embodiment, the burners 300 are configured to be operated substantially in concert, each generating a similar heat output. According to another embodiment, the burners 300 are capable of independent startup and shut-down, enabling a broader range of output levels.

During operation of the burner system 600 of FIG. 6, water is introduced via the water inlet 612 so as to completely fill the water chamber 604, the riser and down-comer tubes 608, 610, and at least a portion of the steam chamber 606. Assuming that each of the burners 300 is operating in heating mode, heat radiating from perforated flame holders 102 is transferred to water in the riser tubes 608, causing the water to expand and flow upward toward the steam chamber 606 and drawing cooler water up from the water chamber 604. As heated water flows into the steam chamber 606, cooler water flows downward from the steam chamber to the water chamber via the down-comer tubes 610. In this way, water is circulated through the system as it is heated. Eventually, water rising in the riser tubes 608 begins to boil, and steam accumulates in the steam chamber 606, from which it is drawn off via the steam outlet 614.

Figure 9:
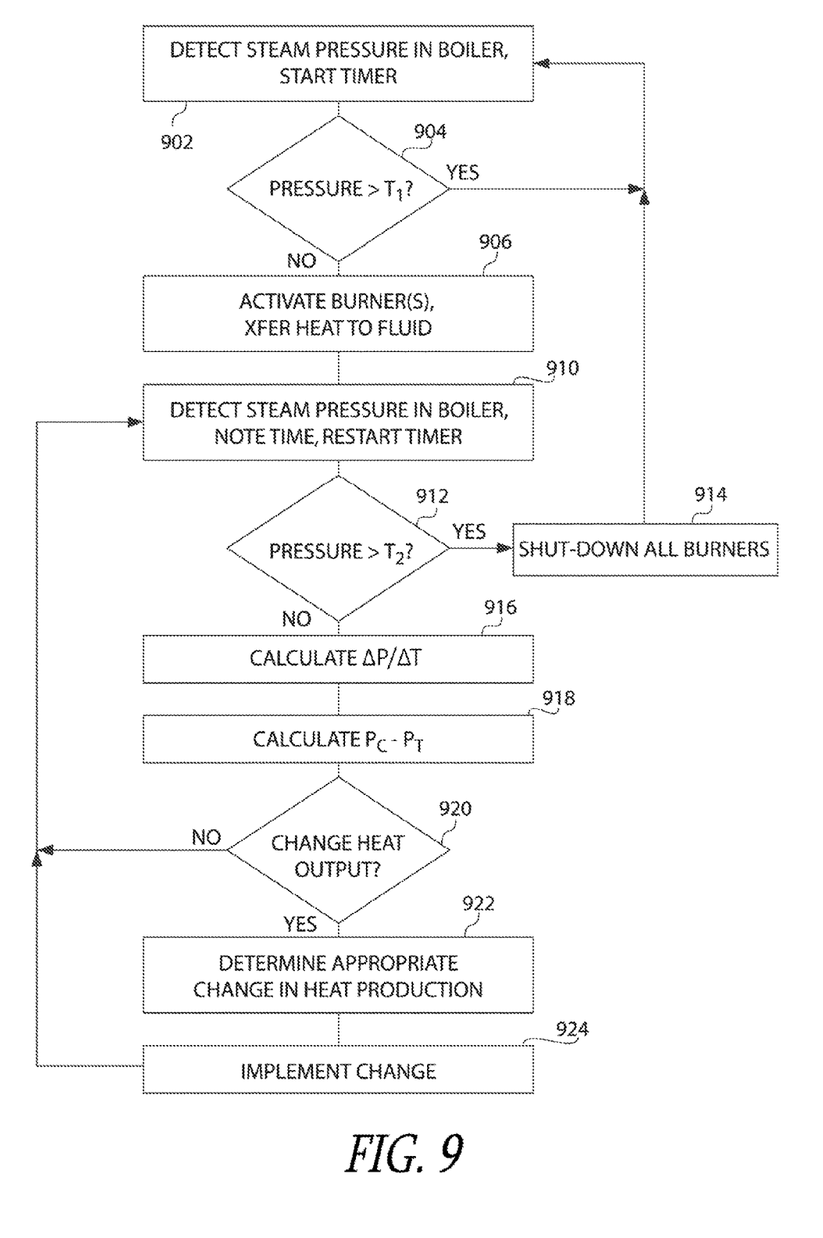
FIG. 9 is a flow diagram illustrating a method of operation of a multi-burner system such as, for example, any of the burner systems of FIGS. 5-8, according to an embodiment.

A pressure sensor 616 is provided, configured to provide a signal to the controller indicative of the boiler pressure. As pressure rises above a first threshold, the controller is configured to shut down one or more of the burners 300, reducing the total heat production. The remaining burners 300 continue to produce heat, which is transferred to water in the riser tubes 608 that are closest to the operating burners 300, thereby maintaining the system pressure. If the rate at which steam is drawn off the boiler 600 increases beyond the current production, boiler pressure drops. As pressure drops below a second threshold—lower than the first threshold, the controller controls the system to preheat one or more additional burners 300, increasing the production capacity of the boiler. FIG. 9 is a flow diagram illustrating a method of operation of a multi-burner system such as, for example, any of the burner systems 500, 600, or 800, according to an embodiment. The process begins at step 902, with the assumption that there are no burners in operation. At step 902, a system parameter is detected and a timer is started. The system parameter can be any of a number of appropriate values, depending in part on the particular type of burner system in operation. Examples include pressure, temperature, fluid volume or flow rate, etc. Hereafter, the method will be described with reference to a boiler system such as that described with reference to FIG. 6, with steam pressure within the boiler being the detected parameter.

At step 904, a determination is made whether the pressure is greater than a first pressure threshold $T_1$. If the pressure is above the first pressure threshold $T_1$, the process returns to step 902 and begins again. If the pressure is below the first pressure threshold $T_1$, the process proceeds to step 906.

At step 906, one or more of the burners are activated, in which the burners are operated for a preselected period in preheat mode, then transitioned to heating mode, in which a lifted flame is held in the apertures of a perforated flame holder of each of the burners in operation, and the perforated flame holders begin to radiate heat, a substantial portion of which is transferred to water in risers of the boiler.

The steam pressure is again detected at step 910, the value on the timer is noted, and the timer is restarted. At step 912, a determination is made whether the pressure is greater than a second pressure threshold $T_2$, which is higher than the first pressure threshold $T_1$. The second pressure threshold $T_2$ represents a maximum safe steam pressure of the boiler. If the detected pressure is greater than the second pressure threshold $T_2$, all burners are shut down in step 914, and the process returns to step 902.

If, in step 912, the detected pressure is not greater than the second pressure threshold $T_2$, the process proceeds to step 916, in which a rate and direction of change of pressure ($\Delta P/\Delta T$) is determined on the basis of the two most recent pressure values and the noted timer value.

According to an embodiment, the rate of change is determined by obtaining a difference between the two most recent pressure values, and dividing the obtained difference by the elapsed time between the steps in which the pressure values were obtained, as indicated by the noted timer value. This yields a value of change in pressure (e.g., psi or kPa) per unit of time. The direction of change is simply a matter of noting the sign of the determined rate of change: if the first of the two most recent pressure values is greater than the second, the difference between them will be a negative value, indicating that the direction is negative, i.e., the boiler is cooling; conversely, if the second value is greater than the first, the result will be positive, indicating that the boiler is heating.

In step 918, a difference and polarity of the most current detected pressure $P_C$ relative to a target pressure $P_T$ are determined. The term polarity is used here to refer to relative magnitudes of values, i.e., a detected pressure can be said to be positive if it is greater than the target pressure, and negative if it is less than the target pressure.

According to an embodiment, the target pressure is a fixed value, selected, for example, during the design process of the boiler on the basis of anticipated capacity and load, and preferred or mandated safety margin. Alternatively, the target pressure can be a value that is variable, such that it can be modified on the basis, for example, of current load, anticipated changes in load, known boiler production capacity, and preferred efficiency and/or safety thresholds.

According to an embodiment, the first pressure threshold $T_1$ is equal to the target value, meaning that if all of the burners are shut down, no burners will be brought into operation while the actual pressure is greater than the target value.

Proceeding now to step 920, a determination is made, on the basis of the rate and direction of change of pressure, and the difference and polarity of the most recent detected pressure relative to the target pressure, whether the rate of heat production should be modified or should remain unchanged.

If it is determined in step 920 that heat production should remain unchanged, the process returns to step 910 and repeats from that point. If it is determined that heat production should be modified, the process moves to step 922, in which the appropriate direction and degree of change in heat production is determined. In step 924, the determined degree of change in heat production is executed, after which the process returns to step 910 and repeats from there.

Performance of step 924 can involve any of a number of actions, depending upon the particular values in consideration, and various design considerations. For example, if the determined degree of change in heat production is relatively small, the change may be only a matter of increasing or decreasing a rate of fuel flow to one or more of the burners, assuming that the particular system is configured to permit adjustments to the fuel supply. On the other hand, if the determined degree of change is greater than can be effected by modifying the output of the burners in current operation—or if modifying the output in this way would result in unacceptable losses of efficiency—then it may be appropriate to modify the number of burners in operation, either by shutting down one or more of the burners in current operation, or by bringing one or more additional burners into operation, as appropriate, and to the extent possible (naturally, if the boiler is already in a maximum output condition, in which all of the burners are in operation, it will not possible to bring more into operation).

Additionally, according to an embodiment, the determined degree of change in heat production, and thus the number of burners that are shut down or brought into operation, may depend, not only on the absolute difference between the current pressure and the target pressure, but also on the rate and direction of change of pressure. For example, assuming a boiler with seven burners, of which four are in operation, if the actual pressure is significantly below the target pressure, and is not rising, or is rising very slowly, it may be appropriate to bring two more burners online. However, if the pressure is rising at a moderate rate, it may be appropriate to bring only one more burner online, to reduce the likelihood of overshooting the target value. Finally, if the pressure is rising very fast, it might be determined that no new burners should be brought online, or even that one or more burners should be shut down, again to prevent shooting past the target pressure.

According to another embodiment, previous rates of change are also considered in determining whether and to what degree the output should be changed. For example, if the pressure is rising toward the target pressure at a moderate rate, but it is determined, on the basis of comparison with several prior iterations of the process, that the rate of change is decreasing, it might be projected that the pressure will not reach the target pressure before it stops rising. Based on such a prediction, it may be determined to bring two or more burners online, where only one burner might be brought online in a case where the comparison with previously determined rates of change suggest that the pressure will continue to rise.

In the embodiment described with reference to FIG. 9, the system is controlled on the basis of steam pressure. According to other embodiments, control is on the basis of other detected parameters, such as, for example, fluid temperature, rate of flow of working fluid through the system, or anticipated demand. Furthermore, although operation of the system is described on the basis of a single parameter, this does not suggest that operation of the system is limited to the single parameter. For example, additional parameters can be monitored and the results used to enhance the operation described above. Alternative embodiments are envisioned in which multiple parameters are detected and evaluated, in order to regulate operation of the respective system.

The embodiments disclosed above are described in the context of water boilers. However, the disclosed principles can be applied in many types of systems in which thermal energy is generated for use in commercial or industrial processes, including, for example, systems in which heat is transferred to a working fluid other than water, as well as other types of burner systems and furnaces. Such systems can include, for example, systems for vaporizing liquefied fuel and systems for operating at temperatures and/or pressures other than those obtainable in water-based systems. Furthermore, some systems may be pressurized to a degree that the working fluid is not permitted to boil until it is well downstream from the "boiler." In other systems, the working fluid may not boil at all. Instead, the thermal energy may be preserved for use in various industrial processes. The particular configuration of a burner system will vary according to the particular application. For example, the configuration of heat exchange structures described with reference to FIG. 6 is not appropriate for every application in which water is used as the working fluid, let alone every system that employs other working fluids, or in systems in which the heat produced is not transferred to a working fluid at all. The particular configuration of such systems, incorporating the principles disclosed above, is a matter of design that is within the abilities of one of ordinary skill in the art, and is therefore within the spirit and scope of the present disclosure.

Where the term heat exchange tube is used in the claims, this is to be understood as including within its scope any tube, pipe, or analogous structure configured to carry a working fluid and to transfer thermal energy to or from the working fluid, unless accompanied by language that explicitly modifies the scope of the term.

Structures configured to electrically connect components or assemblies shown in the drawings are depicted generically as connectors 308, 314, and 618, inasmuch as electrical connectors and corresponding structures are very well known in the art, and equivalent connections can be made using any of a very wide range of different types of structures. As necessary for a given application, connectors can be configured to transmit electrical power, high- or low-voltage signals, data, control logic, etc., and can include a single conductor or multiple, separately-insulated conductors. Additionally, where a voltage potential, control signal, feedback signal, etc., is transmitted via intervening circuits or structures, such as, for example, for the purpose of amplification, detection, modification, filtration, rectification, etc., such intervening structures are considered to be incorporated as part of the respective connector. Where other structures or methods of signal or data transmission are used, such as, e.g., fiber optics or wireless systems, such alternative structures and/or methods are considered to be equivalent to the connectors described here.

In many of the processes described in the present disclosure, some parameter is detected, measured, or determined. As used in the specification and claims, the terms such as detect, measure, determine, etc. are not limited to actually obtaining a value for comparison or calculation. For example, the process described with reference to FIG. 9 includes the steps of detecting a steam pressure in a boiler, and determining whether the detected pressure is greater than a first pressure threshold. While some control systems may be configured to provide an actual pressure value, there are many alternative solutions that are acceptable. For example, if a pressure sensor is a transducer configured to provide a voltage signal that varies directly with the steam pressure, the pressure can be inferred from the value of the voltage signal, but obtaining a pressure value in psi or kPa may not be necessary. The pressure threshold can be represented by a corresponding reference voltage, and the comparison of the actual pressure with the pressure threshold can be performed using a comparator circuit coupled to receive the voltage signal from the transducer at a first input and the reference voltage at a second input. The comparator circuit is configured to produce one of two binary values, depending on which of the two voltage signals is greater.

It can be seen that, in the arrangement described, the pressure is not measured or determined, in a narrow sense of the term, nor is such a value compared with an actual threshold pressure. Instead, a voltage signal that is representative of the actual pressure is compared with a voltage signal that is representative of a threshold pressure, with the necessary determination being made on the basis of the comparison. Nevertheless, where such a configuration is adequate to make the necessary determination, it is considered to perform the corresponding steps, and would thus fall within the scope of a claim that includes a term such as detect, measure, or determine in a definition of such an operation or structure.

Similarly, claim language referring to or reciting operations involving physical parameters, such as pressure, temperature, time, rate, power, etc., includes within its scope processes in which representative or inferred values are manipulated, using, for example, analog or digital circuits or the execution of software instructions, to arrive at a corresponding outcome, even if the actual values of the physical parameters are not employed in the process.

Various units and unit symbols are used herein in accordance with accepted convention to refer to corresponding values. "kV" indicates a value of electrical potential, in kilovolts. 1 kV is equal to $1 \times 10^3$ volts of electrical potential. "W" indicates a value of power, in watts.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

While various aspects and embodiments have been disclosed herein, other aspects and embodiments are contemplated, including embodiments in which elements disclosed with reference to separate embodiments are combined together, and other embodiments in which some of the disclosed elements are omitted or replaced by functionally equivalent element. The various aspects and embodiments disclosed herein are for purposes of illustration and are not intended to be limiting, with the true scope and spirit being indicated by the following claims.

What is claimed is:

1. A burner system, comprising:
   a plurality of nozzles positioned and configured to emit respective streams of fuel into a combustion volume;
   a plurality of flame holders, each including a plurality of apertures extending between first and second faces of the respective flame holder, and each positioned, in the combustion volume, to receive a stream of fuel from a respective one of the plurality of nozzles;
   wherein each of the plurality of flame holders is configured to hold a flame substantially between its first and second faces during a heating operation of the respective one of the plurality of flame holders.

2. The system of claim 1, wherein each of the plurality of flame holders includes a face lying substantially in a common plane.

3. The system of claim 1, comprising a heat intake structure configured to receive thermal energy produced by each of the plurality of flame holders.

4. The system of claim 3, wherein the heat intake structure comprises a plurality of heat exchange tubes extending through the combustion volume and configured to receive heat generated by flames held substantially within one or more of the plurality of flame holders.

5. The system of claim 4, wherein:
   a longitudinal axis of each of the plurality of heat exchange tubes lies substantially parallel to a common axis; and
   the first and second faces of each of the plurality of flame holders lie parallel to a common plane and normal to the common axis.

6. The system of claim 5, wherein the combustion volume is defined by a cylindrically shaped combustion chamber, and wherein ones of the plurality of heat exchange tubes are positioned in a circular configuration, substantially concentric with the cylindrically shaped combustion chamber.

7. The system of claim 6, wherein the plurality of flame holders is arranged substantially within a cylinder defined by the plurality of heat exchange tubes.

8. The system of claim 5, wherein ones of the plurality of heat exchange tubes are arranged between and around ones of the plurality of flame holders.

9. The system of claim 1, comprising a master fuel valve coupled to the plurality of nozzles, configured to regulate a flow of fuel to each of the plurality of nozzles.

10. The system of claim 9, wherein the master fuel valve is configured to regulate the flow of fuel to each of the plurality of nozzles independent of each other.

11. The system of claim 9, wherein the master fuel valve includes a plurality of fuel valves, each coupled to a respective one of the plurality of nozzles and configured to regulate a flow of fuel to the respective one of the plurality of nozzles.

12. The system of claim 9 comprising a controller operatively coupled to, and configured to control operation of the master fuel valve.

13. The system of claim 12, wherein, in controlling operation of the master fuel valve, the controller is configured to independently control a flow of fuel to each of the plurality of nozzles.

14. The system of claim 12, wherein the controller is configured to receive a sensor signal from a sensor positioned to monitor an operating parameter of the boiler system, and to control operation of each of the plurality of fuel valves responsive to a value of the sensor signal.

15. The system of claim 12, wherein the controller is configured to receive a signal representative of a pressure within the boiler system, and to control operation of each of the plurality of fuel valves responsive to a value of the received signal.

16. The system of claim 12, wherein the controller is configured to receive a signal representative of a fluid temperature of the boiler system, and to control operation of each of the plurality of fuel valves responsive to a value of the received signal.

17. The system of claim 12, wherein the controller is configured to control operation of each of the plurality of fuel valves responsive to a volume of fluid transiting the boiler system.

18. The system of claim 17, comprising a plurality of fluid return tubes extending between the fluid input chamber and the fluid output chamber and configured to transmit working fluid from the fluid output chamber to the fluid input chamber.

19. The system of claim 1, comprising:
   a fluid input chamber in fluid communication with a first end of each of the plurality of heat exchange tubes and configured to provide a flow of working fluid to each of the plurality of heat exchange tubes; and
   a fluid output chamber in fluid communication with a second end of each of the plurality of heat exchange tubes and configured to receive a flow of working fluid from each of the plurality of heat exchange tubes.

20. A method of operating a burner system, comprising:

emitting a stream of fuel from ones of a plurality of fuel nozzles and toward respective ones of a plurality of flame holders positioned within a combustion volume; and holding a flame substantially between first and second faces of each of the respective ones of the plurality of flame holders positioned within the combustion volume.

21. The method of claim 20, wherein the holding a flame substantially between first and second faces of each of the respective ones of the plurality of flame holders comprises holding the flame substantially within a plurality of apertures extending between the first and second faces of each of the respective flame holders.

22. The method of claim 20, comprising transmitting heat generated by the flames to a heat-receiving structure positioned proximate to the plurality of flame holders.

23. The method of claim 22, wherein the transmitting heat generated by the flames to a heat-receiving structure includes transmitting the heat to a working fluid within a plurality of heat exchange tubes extending through the combustion volume.

24. The method of claim 20, wherein the emitting a stream of fuel from ones of a plurality of fuel nozzles comprises controlling a flow of fuel to the plurality of fuel nozzles.

25. The method of claim 24, wherein the controlling a flow of fuel to the plurality of fuel nozzles comprises selectively controlling a flow of fuel to each of the plurality of fuel nozzles.

26. The method of claim 25, wherein the selectively controlling a flow of fuel to each of the plurality of fuel nozzles comprises selecting a number of the plurality of fuel nozzles from which to emit a flow of fuel according to a quantity of heat to be generated.

27. The method of claim 25, wherein the selectively controlling a flow of fuel to each of the plurality of fuel nozzles comprises selecting a number of the plurality of fuel nozzles from which to emit a flow of fuel according to a detected parameter of the boiler.

28. The method of claim 27, wherein the selecting a number of the plurality of fuel nozzles from which to emit a flow of fuel according to a detected parameter of the boiler comprises selecting the number of the plurality of fuel nozzles from which to emit a flow of fuel according to a detected pressure within the boiler.

29. The method of claim 27, wherein the selecting a number of the plurality of fuel nozzles from which to emit a flow of fuel according to a detected parameter of the boiler comprises selecting the number of the plurality of fuel nozzles from which to emit a flow of fuel according to a detected fluid temperature within the boiler.

30. The method of claim 27, wherein the selecting a number of the plurality of fuel nozzles from which to emit a flow of fuel according to a detected parameter of the boiler comprises selecting the number of the plurality of fuel nozzles from which to emit a flow of fuel according to a rate of change of the detected parameter.

31. The method of claim 27, wherein the selecting a number of the plurality of fuel nozzles from which to emit a flow of fuel according to a detected parameter of the boiler comprises selecting the number of the plurality of fuel nozzles from which to emit a flow of fuel according to a volume of fluid transiting the boiler.

32. The method of claim 27, wherein the selecting a number of the plurality of fuel nozzles from which to emit a flow of fuel according to a detected parameter of the boiler comprises selecting the number of the plurality of fuel nozzles from which to emit a flow of fuel according to a magnitude and polarity of a difference between the detected parameter and a target value of the parameter.

* * * * *